United States Patent [19]

Bertus et al.

[11] 4,268,188

[45] May 19, 1981

[54] PROCESS FOR REDUCING POSSIBILITY OF LEACHING OF HEAVY METALS FROM USED PETROLEUM CRACKING CATALYST IN LAND FILLS

[75] Inventors: Dwight L. McKay; Brent J. Bertus; John S. Roberts, all of Bartlesville, Okla.

[73] Assignee: Phillips Petroleum Company, Bartlesville, Okla.

[21] Appl. No.: 64,282

[22] Filed: Aug. 6, 1979

[51] Int. Cl.³ ................................................. B09B 1/00
[52] U.S. Cl. .................................... 405/128; 405/129; 252/411 R; 252/461
[58] Field of Search .................. 252/461, 410, 411 R, 252/422, 380; 208/48 AA, 52 CT; 585/704; 405/128, 129

[56] References Cited

U.S. PATENT DOCUMENTS

| | | | |
|---|---|---|---|
| 2,901,419 | 8/1959 | Brill | 252/411 R |
| 3,674,706 | 7/1972 | Box et al. | 252/411 X |
| 4,040,945 | 8/1977 | McKinney et al. | 208/120 X |
| 4,101,417 | 7/1978 | Mitchell et al. | 208/120 |

*Primary Examiner*—W. J. Shine

[57] ABSTRACT

A used petroleum or hydrocarbon conversion or cracking catalyst having metal contaminants thereon which are leachable by water therefrom is treated with tin and/or indium and/or a compound of tin and/or a compound of indium to reduce leachability of said metal therefrom rendering the thus treated contact mass or catalyst more safe to be disposed of at a landfill.

5 Claims, No Drawings

PROCESS FOR REDUCING POSSIBILITY OF LEACHING OF HEAVY METALS FROM USED PETROLEUM CRACKING CATALYST IN LAND FILLS

BRIEF SUMMARY OF THE INVENTION

Prior to disposal thereof, petroleum cracking catalyst having heavy metal resulting from oils treated thereon is treated with tin and/or indium and/or their compounds thereby to minimize leaching by water and therefore pollution of ground water.

DETAILED DESCRIPTION

This invention relates to a process for treatment of a used petroleum cracking catalyst. In one of its aspects, the invention relates to a process for preventing or retarding leaching of heavy metal contained in a used petroleum cracking catalyst as by ground waters. In another of its aspects, the invention relates to a process for protection of ground waters against pollution in areas surrounding or underlying places or landfills in which or onto which a used petroleum cracking catalyst having heavy metals thereon resulting from oils treated is put.

In one of its concepts, the invention provides a process for the treatment of such a catalyst as herein described with tin and/or indium and/or their compounds. In a more detailed concept of the invention, it involves treating a used petroleum cracking catalyst having a metal or metals such as vanadium, chromium, iron, cobalt, copper, arsenic, antimony, platinum and bismuth thereon to render these metals in the form in which they exist on used petroleum cracking catalyst less readily leachable by ground waters thus to prevent contamination of said waters by said metals, the process comprising treatment of such used catalyst with tin and/or indium and/or their compounds. In a further concept of the invention, a catalyst is contacted with the tin, indium and/or the compounds thereof and heating as required to render the same insoluble thus reducing the water-leachability of the metals in the used or heavy metal contaminated catalyst. In a further concept of the invention, still, there is provided a process for treating a used, fluidized, catalytic cracking catalyst, such as now commercially employed, and which may essentially comprise a zeolite or silica-base catalyst with at least one of tin, indium, and their compounds with heating to a temperature at which the oxide of at least one of said tin indium and their compounds, as used, has been formed or will form.

From time to time petroleum cracking catalyst must be discarded and disposed of in a suitable, safe manner. It is desirable to provide a treatment of such a catalyst especially one which is contaminated with certain metal contaminants resulting from oil treated therewith, to render the same more safe to be disposed of in the sense that rain water and/or surface waters which may percolate or come into contact therewith will have a substantially reduced leaching effect upon said catalyst and therefore result in considerably less pollution, if any, of said waters.

It is an object of this invention to provide a process to treat a spent petroleum cracking catalyst. It is another object of this invention to treat a cracking catalyst which has been used to convert oils containing certain metal contaminants resulting in a contamination of the catalyst with said contaminants. It is a further object of this invention to reduce the leachability of metal contaminants from a contact mass or catalyst upon which such contaminant exists. It is a further object of the invention to render more safe for disposal a used petroleum cracking catalyst.

Other aspects, concepts, objects, and the several advantages of the invention are apparent from a study of this disclosure and the appended claims.

According to the present invention, there is provided a process for the treatment of a contaminated catalyst, as herein described, with tin and/or indium and/or a compound of tin and/or a compound of indium.

Still according to the invention, there can be added water insoluble oxides and/or sulfides of tin and indium to the catalyst as in the form of finely divided solids by dispersing or rolling the same or shaking, stirring, etc. Further, according to the invention, an aqueous or organic solution of a compound of tin and/or indium can be placed upon the used catalyst, followed by removal of solvent and then heating in air to a temperature at which the added compound is decomposed to leave a tin and/or indium in substantial proportion as an oxide or sulfide, or other inorganic composition thereof.

Suitable compounds of tin include stannous and stannic oxide and stannous and stannic sulfide. Suitable organic compounds are the tin salts of carboxylic acids such as stannous acetate, stannous butyrate, stannous octanoate, stannous oxalate, and stannous benzoate; tin thiocarboxylates such as stannous thioacetate and stannous dithioacetate; dihydrocarbyltin bis(hydrocarbyl mercaptoalkanoate) such as dibutyltin bis(isoctyl mercaptoacetate); tin thiocarbamates such as stannous propylthiocarbamate and stannous diethyldithiocarbamate; dihydrocarbyltin bis(O,O-dihydrocarbyl thiophosphate) such as dibutyltin bis(O,O-dipropyldithiophosphate); and the like.

Suitable compounds of indium include indium oxides and indium sulfides; also indium salts of the organic phosphates $[(RO)_2PXX]_3In$ where X is selected independently from the group oxygen and sulfur and R is an alkyl group containing from 2 to 20 carbon atoms such as ethyl, isopropyl, hexyl, decyl, and the like; indium tris(O,O-dihydrocarbyl phosphite) such as indium tris-(O,O-dipropylphosphite), salts of organic acids such as indium tallate; and indium dialkyldithiocarbamates such as indium diethyldithiocarbamate.

Tin salts and indium salts of mineral acids, e.g., the halides, nitrates, sulfates, and the like are not considered to be suitable to treat metals-contaminated catalysts unless the acid released by hydrolysis of the salts is removed prior to discarding the catalyst. If not removed the acids will in the presence of water accelerate the rate of leaching of heavy metals from the treated catalyst.

Heavy metal contaminants usually found on FCC catalyst used to crack stocks containing the same that are treated by the process of this invention and thus made less leachable, are vanadium, chromium, iron, cobalt, copper, arsenic, antimony, platinum, and bismuth.

The concentration of tin and/or indium that is required to treat these heavy metals, considered as a group, can range from 1:100 to 100:1 on a weight basis. Routine testing will readily establish the optimum concentration for each application of the invention.

The Environmental Protection Agency (EPA) has provided a procedure to extract solid waste with water to determine whether toxic substances can enter ground water that is used as drinking water. This extraction procedure has been published in the Federal Register, Vol. 43, No. 243, pp. 58956-7 (Monday, Dec. 18, 1978). It differs only slightly from an earlier tentative EPA method that was used to obtain the data on which this invention is based. Other methods to test leachability of the catalyst treated by the process of the invention can be selected by one skilled in the art. It is necessary to ensure compliance with whatever law, local or other, which may be applicable to the presence of the contaminants and/or the substances used in the process of the invention.

The following example will illustrate the process of this invention.

Two samples of equilibrium FCC catalyst from a commercial cracking unit (FILTROL 1000 -FILTROL Corporation) were subjected to said tentative EPA extraction procedure. Catalyst A contained an equilibrium concentration of adventitious metals, i.e., fresh catalyst was being added at a constant rate to replace catalyst losses, and it also contained equilibrium concentration of antimony which was being added to modify the behavior of the contaminated catalyst. Catalyst B was prepared from Catalyst A by adding tin to it as follows: A solution containing 175 parts per million of tin by weight was prepared by dissolving stannous octanoate in topped crude oil. It was then added to 43.0 g of catalyst that was in a fluidized bed reactor, using 24.56 g of oil. The oil was added in five approximately equal increments while the catalyst was being fluidized, at about 510° C.

Chemical analyses of Catalysts A and B are summarized in Table I.

TABLE I

| Element, Wt. % | Catalyst A | Catalyst B |
|---|---|---|
| Nickel | 0.37 | 0.31 |
| Vanadium | 0.70 | 0.68 |
| Iron | 0.86 | 0.75 |
| Cerium | 0.24 | * |
| Sodium | 0.88 | * |
| Antimony | 0.107 | 0.104 |
| Aluminum | 21.4 | 20.4 |
| Silicon | 25.2 | 23.2 |
| Tin | nil | 0.011 |

*Not determined

Catalysts A and B separately were subjected to the tentative EPA extraction procedure:
1. Prepare sample in 8/1 water/sample weight ratio
2. Adjust pH to 5
3. Mix for 24 hours
4. Maintain pH between 4.9–5.2
5. Filter through 0.45 micrometer membrane filter
6. Adjust filtrate volume with water to 10/1 water/sample ratio
7. Repeat procedure with same solid sample
8. Combine adjusted filtrates
9. Analyze Analyses of the filtrates for vanadium, nickel, antimony, and tin were made and are shown in Table II.

TABLE II

| Element, ppm | Catalyst A | Catalyst B |
|---|---|---|
| Vanadium | 23.7 | 13.1 |
| Nickel | 0.8 | 0.8 |
| Antimony | 2.6 | 1.9 |
| Tin | nil | <0.6* |

*This is the limit of detection

Leachate from Catalyst B which had been treated with tin according to this invention contained lower concentrations of vanadium and antimony than were in the untreated sample; there was no difference in concentrations of nickel.

Reasonable variation and modification are possible within the scope of the foregoing disclosure and the appended claims to the invention, the essence of which is that there has been provided a process for reducing the overall leachability by water of contaminating metals from a used hydrocarbon or petroleum cracking catalyst by treating the same to incorporate therewith a tin and/or indium and/or at least one of their compounds, as described.

I claim:

1. A process for discarding a used catalyst or contact mass to be discarded and having thereon metal resulting from its use as a petroleum conversion catalyst, said metal being leachable therefrom with water, which comprises treating said catalyst just prior to its discard with at least one of tin, indium, a compound of tin, and a compound of indium in an amount sufficient and in a manner to stabilize against leaching of metals thereon by ground water and then discarding said catalyst to a place at which ground water exists.

2. A process according to claim 1 wherein the used catalyst contains or has thereon at least one of the following contaminating metals: vanadium, chromium, iron, cobalt, copper, arsenic, antimony, platinum and bismuth.

3. A process according to claim 1 where at least one of a water insoluble oxide and a water-insoluble sulfide of at least one of tin and indium is added to the used catalyst.

4. A process according to claim 1 wherein at least one of the tin and indium is added to the catalyst by impregnation, solvent employed is removed and the mass is heated to decompose the compound with which the catalyst has been impregnated to form thereof at least one of an oxide and sulfide.

5. A process according to claim 1 wherein the compound of tin is one of the following: stannous oxide, stannic oxide, stannous sulfide, stannic sulfide, a tin salt of a carboxylic acid, a tin thiocarboxylate, a dihydrocarbyl tin bis(hydrocarbyl mercaptoalkanoate), a tin thiocarbamate and a dihydrocarbyl tin bis(O,O-dihydrocarbyl thiophosphate) and the compound of indium is at least one of indium oxide, indium sulfide, and indium salt of the organic phosphate

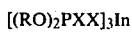

wherein each X is selected from the group of oxygen and sulfur and wherein R is an alkyl group containing from 2 to 20 carbon atoms, indium tris(O,O-dihydrocarbyl phosphite), an indium salt of an organic acid, and an indium dialkyl dithiocarbamate.

* * * * *